United States Patent [19]

Hauge

[11] 4,012,491

[45] Mar. 15, 1977

[54] PHOSPHATE PROCESS

[75] Inventor: Douglas Oliver Hauge, Lafayette, Calif.

[73] Assignee: United States Gypsum Company, Chicago, Ill.

[22] Filed: Oct. 25, 1974

[21] Appl. No.: 518,128

Related U.S. Application Data

[63] Continuation-in-part of Ser. No. 190,511, Oct. 19, 1971, Pat. No. 3,919,395, which is a continuation-in-part of Ser. No. 90,542, Nov. 18, 1970, abandoned.

[52] U.S. Cl. .............................. 423/309; 423/311; 423/319; 423/167
[51] Int. Cl.² ................. C01B 15/16; C01B 25/26; C01B 25/16
[58] Field of Search .......... 423/166, 167, 319, 320, 423/305, 307–309, 311–313

[56] References Cited

UNITED STATES PATENTS 2,115,150  4/1938  Seyfried ............................ 423/166
2,857,245  10/1958  Fallin ................................ 423/167

FOREIGN PATENTS OR APPLICATIONS 938,468  10/1963  United Kingdom ............... 423/320

*Primary Examiner*—Oscar R. Vertiz
*Assistant Examiner*—Gregory A. Heller
*Attorney, Agent, or Firm*—Kenneth E. Roberts; Robert H. Robinson; Samuel Kurlandsky

[57]  ABSTRACT

Phosphate values of high purity and concentration may be efficiently recovered from a wide range of phosphatic-mineral-containing materials including as-mined phosphate ore by leaching such ore with a dilute aqueous mixture of sulfuric and hydrochloric or nitric acid, and precipitating phosphate values as dicalcium phosphate. This product, which is already suitable for use in animal feed and agricultural fertilizer, can also be readily converted to the many other agricultural and industrial phosphate products without costly purification operations or means of control of pollution to the surrounding environment.

13 Claims, 3 Drawing Figures

PHOSPHATE PROCESS

CROSS-REFERENCE TO RELATED APPLICATIONS

This application is a continuation-in-part of copending U.S. Ser. No. 190,511 filed Oct. 19, 1971 now U.S. Pat. No. 3,919,395 which is a continuation-in-part of U.S. Ser. No. 90,542 filed Nov. 18, 1970 now abandoned.

BACKGROUND OF THE INVENTION

This invention relates to an improved process for the recovery of phosphate values from phosphatic-mineral-containing materials; and more particularly relates to chemically leaching phosphate values from any phosphatic-mineral containing material with a novel mixture leach acid.

Production of phosphorus-containing products is a long established and commercially important industry and with the demand rapidly rising, especially in the production of food for the growing world population, phosphorus becomes increasingly more important to the overall world need. Thus there is a need for an improved process for the treatment of phosphatic materials, and more particularly to the selective extraction and concentration of phosphate values from a wide range of phosphatic materials, including besides rock, as-mined phosphate ores and phosphatic waste materials regardless of contaminating chemical and mineral impurities such as iron oxide, aluminum oxide, silica, clay, etc. or their quantity in the phosphatic mineral source.

Prior processes for the production of most phosphate products require phosphate rock. Phosphate rock for phosphate processes must be relatively free of sand, slimes, and iron oxide, aluminum oxide, and any other impurity that chemically interferes with the solubilizing and separation of phosphate. Also, rock must have removed from it those minerals which interfere with the chemical processing operations such as filtration, crystallization, solubilization, etc.

The operations of converting phosphate ore to phosphate rock are costly and produce adverse environmental conditions. Besides contamination of the surrounding area with silts, the removal of slimes (iron minerals, aluminum minerals, and other fines) produces large slime ponds which take years to eliminate. Further, processing losses of phosphate values for rock production can be as much as 40 percent. In addition many sources of phosphatic materials cannot be so processed.

The processing of phosphate rock whether by the wet method, that is present day chemical extraction, or the furnace method will also produce problems of contaminating the surrounding environment unless extensive and costly provisions are made to contain the obnoxious chemicals.

While there are patents which may deal with a dilute acid alone they have a number of deficiencies. British Pat. No. 938,468 and published Dutch application No. 700,258 allude to some attempt to utilize a dilute acid in a wet method but such require inter alia either great insufficiencies or excesses of acid quantity; overstepping or under-stepping multiple additions to stationary leaching vessels; and obtaining monocalcium phosphate leach liquors. In addition, investigation indicates these processes never achieved any degree of commercial acceptance.

This invention both eliminates the need for the production of phosphate rock and its adverse affects such as slime ponds, etc., and also the obnoxious chemical contamination produced by the processing of rock to phosphate products in a commercially feasible process.

OBJECTS OF THE INVENTION

Thus it is an object and advantage of the present invention to chemically extract or leach phosphate values from any phosphatic-mineral-containing material.

Another object and advantage is the efficient recovery of phosphatic values of high purity and concentration from a wide range of phosphatic-mineral-containing materials including rock, as-mined phosphate ores regardless of their contaminating chemical and mineral impurities or the quantity of such impurities, phosphate waste materials and other difficult or heretofore unuseable phosphatic materials.

Still another object and advantage is the efficient recovery of phosphate values from any phosphatic-mineral-containing material, eliminating the need for the production of phosphate rock and its adverse effects including slime ponds and problems of contaminating the surrounding environment and also the obnoxious chemical contamination produced by the processing of rock to phosphate products.

Still a further object and advantage is producing by the same conditions a product which is both already suitable for animal feed and agricultural fertilizer, and yet also readily converted to the many other agricultural and industrial phosphate products without costly purification operations or means of control of pollution to the surrounding environment.

Still another object is leaching phosphate values whereby there is present a sufficient quantity of hydrogen ion to replace the calcium ion in the phosphorus material source thus making phosphoric acid but in which there is no excess hydrogen ion such as is now practiced in present day processes, yet there is further present sufficient calcium ion in solution to control selective extraction and concentration of phosphate values apart from chemical and mineral impurities.

Still another object and advantage is leaching soluble phosphate values from phosphate bearing ores without going through the process requirements of upgrading phosphate ore to phosphate rock.

Still another object and advantage is leaching soluble phosphate values selectively with only minute amounts of metals and other minerals and chemicals.

A further object and advantage is leaching phosphate values in a manner which will not cause excessive corrosion to the leaching equipment and which allows the use of less costly equipment.

Still another object and advantage is selectively leaching phosphate values from phosphatic materials in which a filter aid media is produced in the leaching zone and is thus available for assistance in separation of the leach liquor and the phosphatic source material tailings.

Still further objects and advantages are minimizing or avoiding foaming in the leaching operation; utilizing part of the material feed to reduce subsequent stage neutralizing agent addition; providing for ready separation of source material tailings from the leach liquor and improved filtration at various stages, and selectively extracting phosphate values in a form in which they are readily converted to a wide variety of agricultural grade and industrial grade products.

SUMMARY OF THE INVENTION

The present invention is a process for chemically leaching phosphate values from phosphatic-mineral-containing material in which the phosphatic material is treated by a mixture of acids, contacting the phosphatic material with about 6 equivalents of acid and about 1 mole of calcium per mole of $P_2O_5$ in the phosphatic-mineral-containing material and withdrawing a leach liquor containing about 5–7% $P_2O_5$. In a further embodiment the pH of the leach liquor is raised to about 2–3 to precipitate impurities, which are then separated from the liquor; and then the pH is raised to about 3–5 to precipitate calcium phosphate, which is then separated from the recycleable liquid.

DETAILED DESCRIPTION OF THE PREFERRED EMBODIMENTS

Figure 1:
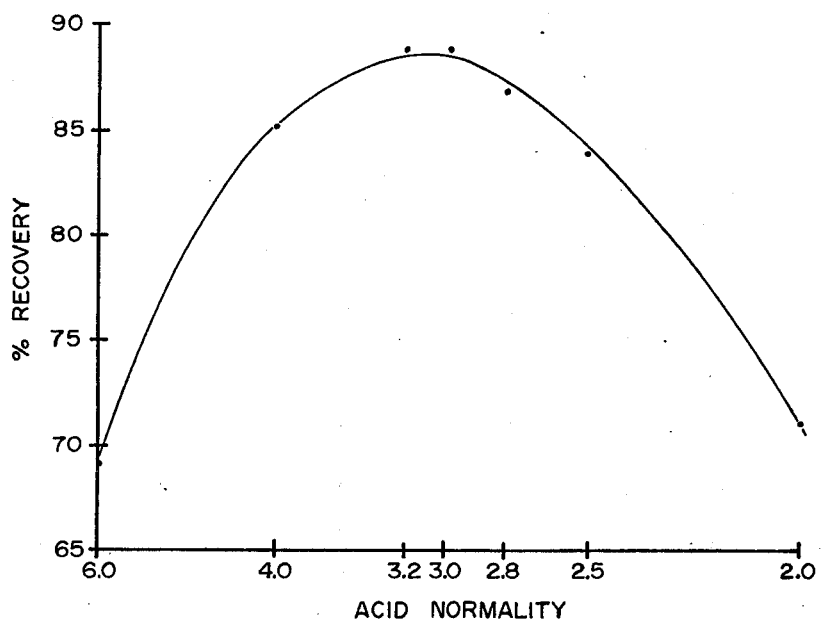
FIG. 1 is a chart depicting the relationship between normality of total acid and percent recovery of phosphate values during a first extraction.

In copending applications U.S. Ser. Nos. 190,511 and 90,542, the advantages of using dilute hydrochloric acid or nitric acid for the recovery of phosphate values were illustrated, as shown in FIG. 1. It has now been found that a primary objective in leaching phosphate values is to have a sufficient quantity of hydrogen ion to replace the calcium ion in the phosphatic-mineral-containing source material to produce phosphoric acid, but that there should not be any substantial excess hydrogen ion such as now practiced in present day processes, and there should be sufficient calcium ion brought into a solution to control the concentration and formation of hydrofluoric acid. After extensive experimentation it has been found that this cannot be satisfactorily obtained using one dilute acid alone but can be obtained using acid mixtures of either hydrochloric acid or nitric acid with sulfuric acid. Thus it is found the above and other objects and advantages of the present invention are accomplished basically by contacting the phosphatic material with a leach acid containing on the order of about 6 equivalents of acid per mole of $P_2O_5$ in the phosphatic-mineral-containing material and about 1 mole of calcium per mole of $P_2O_5$ in the phosphatic-mineral-containing material and withdrawing a phosphoric acid leach liquor containing about 5–7% $P_2O_5$.

Such conditions are preferably met by proportioning about ¾ mole hydrochloric or nitric acid, about 1⅛ mole sulfuric acid as the mixed acids with 52⅓ mole water. Further it is found that, in a highly preferred embodiment, an exceptionally efficient recovery of phosphate values of high purity and concentration may be made from a wide range of phosphatic-mineral-containing materials through the use of an aqueous mixture of sulfuric and hydrochloric or nitric acid to selectively extract the phosphate values around optimum proportions on the order of 0.750 moles hydrochloric or nitric acid, 1.125 moles sulfuric acid and 52.29 moles water; or in engineering terms, on a 100% acid basis, around on the order of 0.0254 tons hydrochloric acid or 0.0438 tones nitric acid, 0.1022 tons sulfuric acid and 0.8724 tons of water. The quantity of these mixed acids, hereinafter referred to as leach acid, to be used per ton of $P_2O_5$ in the phosphatic-mineral-containing materials is on the order of about 15.2 tons for optimized efficiency. This presents to the phosphatic-mineral-containing material the optimum preferred proportions of about 0.386 tons hydrochloric acid or about 0.666 tons nitric acid, about 1.55 tons sulfuric acid and about 13.25 tons of water per ton of $P_2O_5$ in the phosphatic material. As shown by the curve in FIG. 2, it is obvious of course that there can be substantial variation from these quantities without much loss of advantages. The leach liquor may then preferably be concentrated and purified by step-wise raising its pH to about 2–3 and then to about 3–5; and more preferably to 2.2 approximately; to 2.8 approximately; and then to 3–5.

Figure 2:
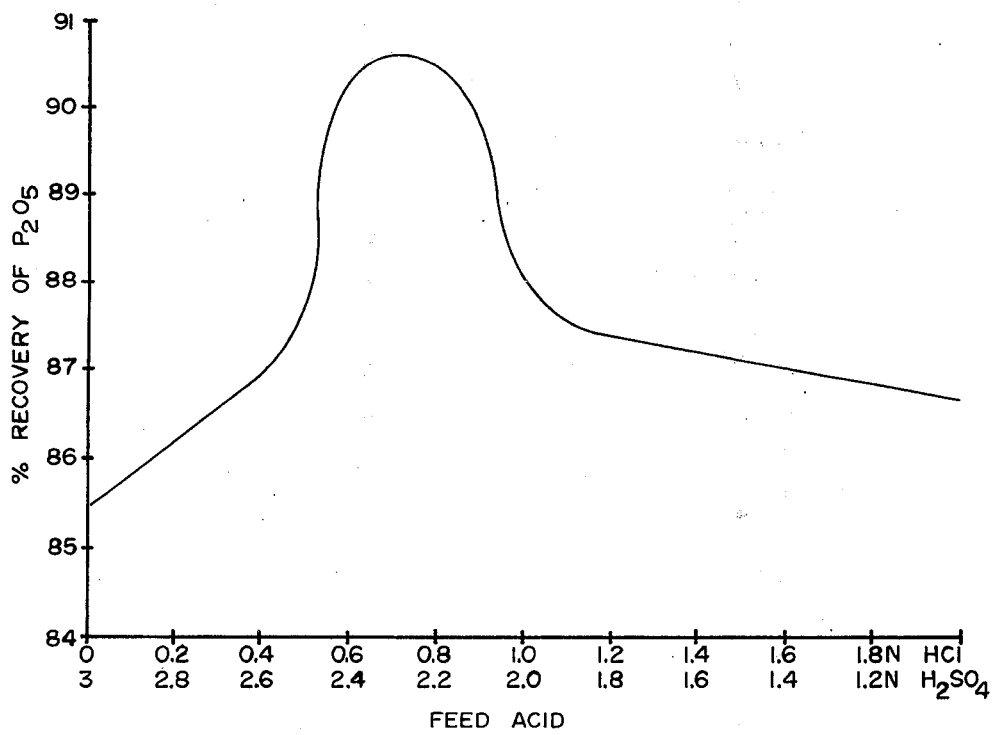
FIG. 2 is a chart depicting the relationship between an acid mixture of varying proportions of sulfuric acid and hydrochloric acid and percent recovery of phosphate values during a first extraction.

In contradistinction to published statements in patent literature, it has been found that utilizing leach acid mixture and concentrations around the parameters of FIG. 2, the manner in which the phosphate-containing material and leach acid were brought together made no difference. Thus adding leach chemicals so as to maintain any given acidity concentration, making countercurrent flows between the phosphate material and the acid, or varying the agitation had no substantial effect on selectively leaching the phosphate values in the phosphate mineral containing sources. Only the quantity of leach acid per unit of $P_2O_5$ and the concentration of the original leach acid mixed acids are really significant. It was found, at ambient temperatures with these proportions and concentration, that the reaction rate for solubilizing the phosphates is so rapid, e.g. less than 15 minutes, and the reaction rates of the impurities were so slow, e.g. better than 4 hours, that little contamination of the leach liquor by the mineral impurities occurred.

With the present leach acid there is a control of the amount of calcium coming into solution from the phosphatic mineral source material. The combination of the two acids provides acid moiety for solubilizing phosphate and calcium while the proportioning between the two acids provides sulfate moiety to control or prevent too much calcium in solution. If the amount of calcium in solution in the leach acid is not at its maximum concentration relative to the digestion of phosphate, some of the hydrogen ion present is being used to first solubilize the calcium and the remaining acid will begin to solubilize the other mineral impurities associated with the phosphatic-mineral-containing material. However, if the solubilized calcium content is too high then the acid will be exhausted in maintaining that solubility at the expense of digesting the phosphate of the feed material.

As shown in FIG. 1 when the total acid present is around three normal (or six equivalents of mixed acids per mole $P_2O_5$ due to the sulfuric acid providing two equivalents per mole) there is a greater than 85% recovery on a first extraction. Using a preferred first contact with about 90% of the total leach acid quantity and a second contact with the remaining quantity of leach acid or second extraction provides in practice over 95% recoveries. As can be seen from FIG. 1 the total acid concentration can vary widely around the preferred six equivalents of acid per mole of $P_2O_5$ without substantial loss of efficiencies of leach. However any further variance does materially affect efficiency and the tolerable loss of efficiencies will depend on the economies of the particular phosphatic source material. Thus waste or trash materials may tolerate commercially losses which would be intolerable commercially for clean high grade ore or other marketable source materials. Also second extractions provide increased recoveries and in some cases it is desirable to operate at lower efficiencies for a first of multiple extractions.

As shown in FIG. 2, which also represents results on the first of two extractions, the proportions of hydrochloric or nitric acid to sulfuric acid may vary widely around the optimum of about 1:4 to 1:2 without any substantial loss of efficiencies. Thus generally there may be used, without substantial loss of high percent recovery, proportions of about ¾ mole hydrochloric acid, about 1¾ mole sulfuric acid and about 52⅓ moles of water; or more generally in engineering terms about 0.0216–0.0292 tons hydrochloric acid or about 0.0372–0.0504 tons nitric acid, about 0.0869–0.1175 tons sulfuric acid and about 0.7415–1.0033 tons of water; and contacting the phosphatic material at a rate of about 13.7–16.7 tons of leach acid per tone of $P_2O_5$ in the phosphatic-mineral-containing material. However further variance materially affects efficiencies although percent recovery is still high. The tolerable loss of efficiencies will depend on the economics of the particular phosphatic source material; and thus in practice the values above may vary widely.

Greater deviations from the proportions set forth above for the leach acid are generally inadvisable as either not providing sufficient calcium in solution as to prevent solubilizing appreciable amounts of impurities or leaching too much calcium ion in solution, which results in a chemical blocking of the extraction in that it becomes saturated with respect to solubilized calcium and then there is insufficient free hydrogen ion available to dissolve more phosphate. It has been found that the resulting leach liquor should be withdrawn from the leach zone when it contains about a 5–7% $P_2O_5$ content, and preferably about 6–6.5% $P_2O_5$ content. If the leach is allowed to go above this range, then the leach liquor becomes saturated with calcium and does not extract more phosphate values except by the introduction of increasing amounts of impurities.

The relatively dilute phosphate value in this phosphoric acid leach liquor may then be separated, purified and concentrated from the solution by partial precipitation of the minute quantities of minerals therein such as principally aluminum, iron and fluoride. It can then be concentrated to better than 40% $P_2O_5$ as dicalcium phosphate using an alkaline material for neutralization. The resultant dicalcium phosphate is of technical grade, and therefore may be converted to the other many phosphate products readily, by well known existing processes with no emissions of obnoxious gases or materials.

Figure 3:
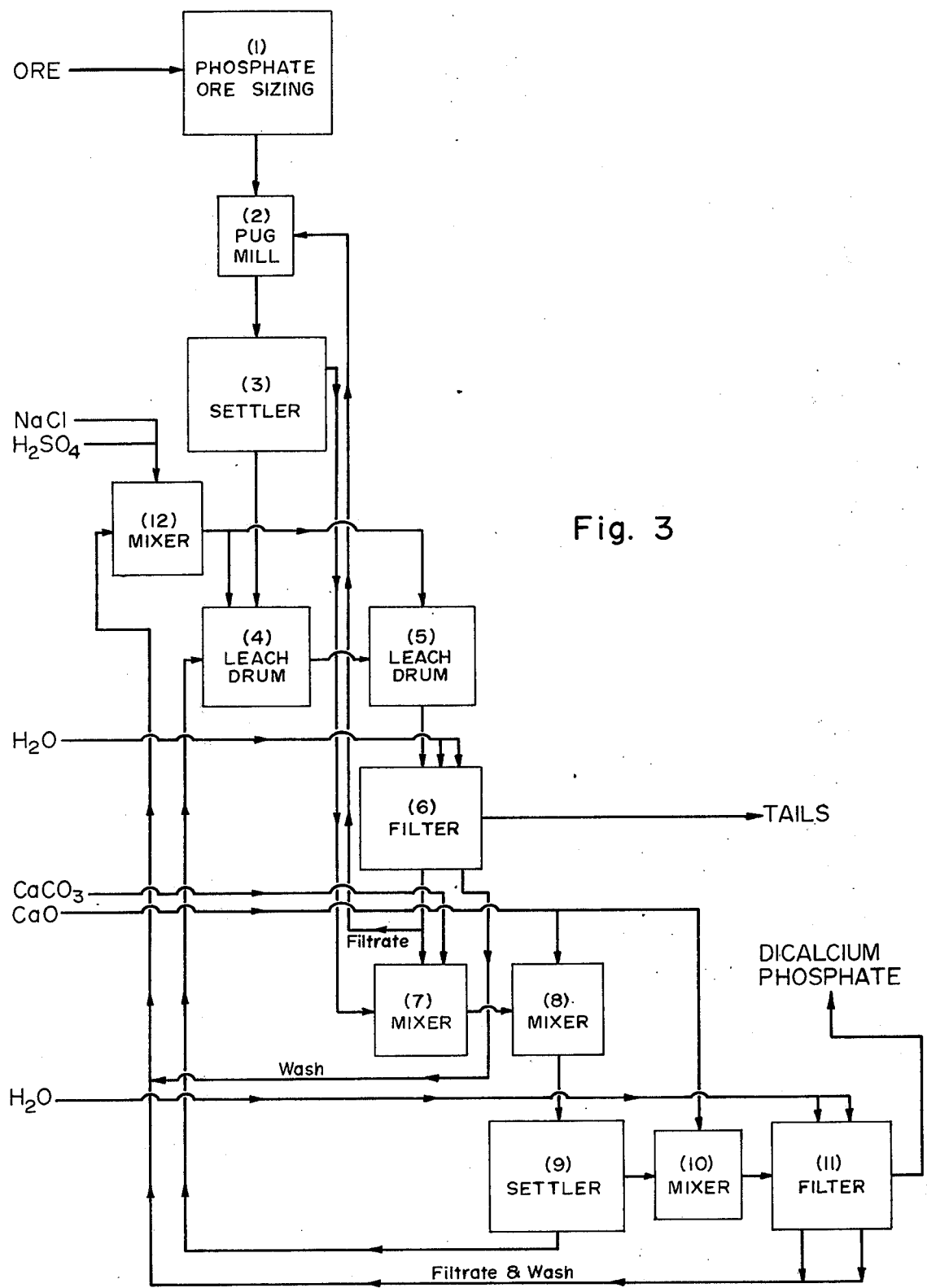
FIG. 3 is a flow chart of a preferred embodiment of the present invention.

Referring to FIG. 3, there is shown a flow chart of a preferred embodiment of the present process. In this preferred embodiment a phosphatic-mineral-containing source material, as-mined ore, is crushed if necessary by a jaw crusher and an impactor and sized 1. The object of sizing the ore is to primarily provide a course crushing so as to avoid the presence of substantial quantities of very fine particles and, in particular, sands and silica fines, which may affect filtration of trailings depending upon the character of the ore source. Twelve mesh sizing is sufficient for ore extraction by the present process, but it was determined in pilot plant operations that, for the size of the leaching equipment used, more uniformity of leaching results by maintaining a more uniform smaller sizing of the particles. The impactor sizes the ore to pass through preferably an about 60 mesh Tyler screen. It may be advantageous to perform a simple washing out of silicas and sands from the ore before passing the ore to the plug mill 2 for wetting by the leach liquor filtrate, underflow from filter 6, and removal of the calcite mineral contained in the ore.

Pre-wetting and degassing of the phosphate bearing mineral material is done with a pug mill type of mixer 2, using the phosphoric acid in the leach liquid. Gas, carbon dioxide from the calcite, it was observed prevented leach acid penetration with certain phosphate mineral sources by causing a flotation effect on the ore. Also, if the phosphate is leached together with the calcite, a foam is created that is difficult to eliminate. Passing the ore through the pug mill with a small amount of leach liquor overcomes these problems. The amount of leach liquor to be recycled to the pug mill is dependent on the amount of calcite present in the particular phosphate mineral source material. This pre-wetting solubilizes and removes the calcite in the ore before the main body of leach acid is added.

From the pug mill 2 the slurry of crushed ore and leach liquor goes to settler 3 for separating the ore from the gas and supernatant partly neutralized leach liquor; and the underflow from settler 3, which is wetted and degassed ore, then goes to the first leach drum 4 while the overflow passes to mixer 7.

In this preferred embodiment two succesive leach vessels 4 and 5 are utilized for most efficient leaching. While any leaching vessel that is known in the trade may be used, it is preferred to take advantage of a sluicing type mixing, such as accomplished by a drum with lifter vanes rotating on its horizontal axis since the quantity of liquid is rather large with respect to the solids present and since there are usually abrasive particles such as sharp silica particles in the phosphatic mineral source material which are detrimental to turbine mixing. While all of the leaching may be accomplished in a single leaching vessel, any number of vessels may be used and it is preferred for higher efficiencies that about 90% of the quantity of leach acid be added to a first leaching vessel such as drum 4 and the remaining 10% quantity be added to a second leach vessel such as drum 5. The data set forth in FIG. 1 and 2 represent efficiencies attained in the first drum 4 to which 90% of the quantity of leach acid is added to leach the phosphate from the ore by being gently slurried with the ore. In the drums, funnel-shaped lifters are so arranged that as the drum rotates on its horizontal axis, the lifters pick up the liquid and solids in the large opening of the funnel, and as they become increasingly constricted by the funnel narrowing, slurrying is caused by the increase in velocity which produces turbulence resulting in excellent sluicing action.

From the first leach drum 4, with a retention time of approximately 15 minutes the slurry is passed to a second leach drum 5 with the remaining quantity of leach acid being added. Approximately 90% of the reaction takes place in the first leach drum, dependent on the type of phosphatic mineral source material leached. The data utilized in assembling FIGS. 1 and 2 were taken from such a first extraction. The second leach drum 5 completes the reaction with better than 98% of the phosphate being extracted from the phosphatic minerals source material. In contrast hereto in commercial operations by the utilization of rock, at this stage of processing, there have been losses of up to 45% of the phosphate values from the starting ore.

Total time for extraction in the leach zone, represented in the preferred embodiment by the two leach drums 4 and 5, is not more than about ½ hour and the temperature is preferably approximately 120° F. As the leaching reaction is slightly exothermic; the process is run at ambient temperatures without applied heat and allowed to rise exothermically. It is preferred to allow the temperature to rise to about 100°–140° F. As operation temperatures rise substantially over 140° F the proportions of impurities solubilized increases substantially, since phosphate solubility has a low activation energy and therefore is not greatly affected by such increased temperatures but the impurities solubilities have greater activation energies and are more affected by such increased temperatures. It is preferred that the temperature generally be about 120°–135° F, and particularly approximately 120° F, so as to produce a gypsum in the extraction zone which becomes a filter aid for the leach liquor. Maintaining the temperature between about 120° F and 135° F will produce a stubby monoclinic gypsum that assists in filtering the ore tailings. This temperature range is then desirable when off grade phosphatic-mineral-source materials are being treated which have characteristics which make handling of the tailings difficult, but such temperature range is neither necessary nor desirable for phosphatic mineral source materials that do not give rise to tailings which are difficult to filter. Also at these temperatures materials such as plastics and neoprene elastomers may be used for the equipment since they will not corrode or be adversely effected.

From the extraction zone represented by the two leach drums 4 and 5, the slurry is passed to a filter 6 to separate ore tailings from the leach liquor. Separation of the ore tailings from the leach liquor can be done by simple and inexpensive extractor type filters such as those manufactured by EIMCO. It has been found that the gypsum produced in the extraction zone is of a crystal type that disperses the plastic clay-like materials along with the rest of the tailings throughout the total filter cake. This leaves the filter cake readily permeable for dewatering and washing, two water washes being shown in FIG. 3. The tailings from the filter are semi-dry with approximately 30% moisture and can be used for land fill such as of the pit from which the ore was removed.

Although the resulting relatively dilute leach liquor may be used directly for agricultural products, it is generally found desirable to concentrate and purify the leach liquor by step-wise precipitations to first precipitate and separate minute impurities and then precipitate and separate calcium phosphate.

The filtrate from filter 6 is passed to mixer 7 in which partial precipitation and purification concentration are commenced by additions of any alkaline material to raise the pH of the filtrate. It is preferred on initial partial precipitations to use the supernatant partly neutralized leach liquor drawn off from settler 3 containing the calcite mineral of the ore to offset the alkali requirements required in neutralizing the leaching liquor as shown in FIG. 3. It is additionally preferred on initial partial precipitations to add calcite (ground limestone) by sifting it over a broad cascading stream of leach liquor filtrate as it goes into the mixer 7. This is done to disperse the alkali as extensively as possible, so as to cause a minimum of precipitation of calcium phosphate at this stage. The quantity of alkali added is that which will bring the pH of the solution into the range of about 2–3, and more preferably in step-wise fashion to first 2.2 approximately to precipitate small amounts of iron and aluminum which may have been solubilized in the leach. Continuing neutralization to a pH of 2.8 approximately precipitates fluoride, and this can be done as above, but more preferably with lime instead of calcite. Thus lime is added to mixer 8 and the fluoride is precipitated, preferably followed by filtering and a water wash, which may be a double wash or more washes, as shown in FIG. 3 for filter 6, to separate the fluoride.

From mixer 8, the slurry is sent to a settler 9 to settle out any remaining precipitated impurities. The underflow of settler 9 with the iron, aluminum, fluoride and other minerals precipitated is optionally recycled to the first leach reactor 4 where any calcium phosphate that may also have been precipitated is redissolved for high efficiency operation. The iron, aluminum and fluoride impurities remain in the solid form and may then be filtered and disposed along with the tailings from filter 6.

The overflow of settler 9 goes to mixer 10, where sufficient alkali is added to precipitate the phosphate from the solution, preferably as calcium phosphate. Generally, thus, the pH is raised to the range of about 3–5 and preferably about 4.4. The manner of introducing the alkali is preferably the same as was done for mixer 7, accompanied preferably by filtering and washing with an extractor type filter (EIMCO), which also produces a well washed product free of chloride. The alkali used may be of any type; however, it is preferred that it be either calcium carbonate or calcium hydroxide for reasons of economy and availability. Preferably, slaked lime, calcium hydroxide, is added to mixers 8 and 10. The slurry is then passed from mixer 10 to filter 11, wherein the precipitated calcium phosphate is dewatered and washed, preferably with two water washes as shown in FIG. 3. The washed calcium phosphate material can then be dried and granulated for direct use in an animal feed or fertilizer, or may be further processed as described hereinafter.

The filtrate from filter 11 passes to mixer 12. Here the filtrate from the dicalcium phosphate separation can be diluted with all or any portion of the filter washes, and whatever necessary water make-up for recycle leach acid is added and mixed with sulfuric acid and a water soluble alkali metal salt of the hydrochloric or nitric acid to produce the mixed acid for a recycling to a new leach cycle. The water soluble alkali metal salt is added to make-up for slight salt losses, if any, of the hydrochloric acid or nitric acid. Thus preferably sodium chloride would be added to make up for chloride losses, estimated to be generally less than 1% loss of hydrochloric acid, in the process and an alkali metal nitrate to make up for possible nitrate losses estimated to be generally less than about 1% loss of nitric acid. In pilot plant operations, the additional alkali metal from the salt addition was proven beneficial in the overall process and did not accumulate in the recycle streams. The so-produced recycle acid is a slurry of the mixed leach acid and gypsum, and returns to the leach drums 4 and 5 for the next leach cycle.

The precipitated calcium phosphate, dewatered and washed from filter 11 may be made into additional ore from Montpelier; an upgraded Florida "trash" concentrate from Bartow and Sahara rock from Africa.

| MATERIAL | WT lbs. | P₂O₅ % | P₂O₅ lbs. | F % | F lbs. | Fe₂O₃ % | Fe₂O₃ lbs. | Al₂O₃ % | Al₂O₃ lbs. | TAILS lbs. |
|---|---|---|---|---|---|---|---|---|---|---|
| Calif. Ore (Pine Mt.) | 1176 | 8.50 | 100 | .56 | 6.59 | 1.57 | 18.5 | .81 | 9.52 | 1211 |
| Leach Liquor | 1467 | 6.65 | 97.5 | .30 | 4.40 | .14 | 2.05 | .08 | 1.17 | |
| Calcium Phos. | 248 | 38.4 | 95.1 | .15 | .37 | .08 | .20 | .02 | .05 | |
| Phos. Acid | 238 | 40.0 | 95.0 | .08 | .19 | .05 | .12 | .01 | .02 | |
| % Extraction | | 95.0 | | 2.88 | | .65 | | .21 | | |
| Florida Ore (Bartow) | 575 | 17.4 | 100.0 | 1.47 | 8.75 | 2.17 | 12.47 | .45 | 2.59 | 626 |
| Leach Liquor | 1467 | 6.66 | 97.7 | .45 | 6.60 | .13 | 1.91 | .05 | .73 | |
| Calcium Phos. | 235 | 40.6 | 95.5 | .11 | .26 | .07 | .16 | .02 | .05 | |
| Phos. Acid | 238 | 40.1 | 95.3 | .07 | .17 | .04 | .10 | .02 | .05 | |
| % Extraction | | 95.3 | | 1.94 | | .80 | | .02 | | |
| Idaho Ore (Montpelier) | 303 | 33.0 | 100.0 | 2.34 | 7.09 | .38 | 1.15 | .37 | 1.12 | 324 |
| Leach Liquor | 1467 | 6.65 | 97.6 | .40 | 5.87 | .07 | 1.10 | .05 | .73 | |
| Calcium Phos. | 236 | 40.4 | 95.4 | .14 | .33 | .09 | .21 | .03 | .07 | |
| Phos. Acid | 233 | 40.8 | 95.0 | .10 | .23 | .07 | .16 | .02 | .05 | |
| % Extraction | | 95.4 | | 2.38 | | 14.78 | | 4.46 | | |
| Fla. Conc. (Bartow) | 318 | 31.5 | 100.1 | 2.50 | 7.95 | 1.39 | 4.42 | .96 | 3.05 | 363 |
| Leach Liquor | 1468 | 6.62 | 97.2 | .38 | 5.58 | .13 | 1.91 | .08 | 1.17 | |
| Calcium Phos. | 233 | 41.8 | 95.0 | .13 | .30 | .11 | .25 | .02 | .05 | |
| Phos. Acid | 239 | 39.8 | 95.0 | .11 | .26 | .10 | .24 | .02 | .10 | |
| % Extraction | | 95.0 | | 3.27 | | 5.42 | | 3.27 | | |
| Sahara Rock (Africa) | 282 | 35.5 | 100.1 | 3.40 | 9.59 | .10 | .30 | .11 | .31 | 334 |
| Leach Liquor | 1468 | 6.81 | 99.8 | .16 | 2.35 | .02 | .03 | .02 | .03 | |
| Calcium Phos. | 207 | 48.1 | 99.6 | .12 | .25 | .02 | .03 | .02 | .03 | |
| Phos. Acid | 248 | 40.1 | 99.6 | .10 | .25 | .02 | .03 | .02 | .03 | |
| % Extraction | | 99.6 | | 2.61 | | 10.00 | | 9.67 | | | agricultural or industrial products. If phosphoric acid is to be the final product, then sulfuric acid is added in stoichiometric amounts and the by-product gpysum precipitated is removed by filtration. In this fashion, phosphoric acid of 40% P₂O₅ is readily produced, which is suitable directly for the production of, for example, diammonium phosphate or polyphosphoric acid (super phosphoric) by concentration. If ammonium phosphate is to be produced, acid ammonium sulfate is used in place of the sulfuric acid. If desired the acid ammonium sulfate can be obtained by adding to each mole of sulfuric acid one mole of ammonium sulfate or by ammoniation of the sulfuric acid directly. Again, as with the phosphoric acid product, by-product glysum is precipitated and is separated by filtration. In similar fashion, potassium, sodium and the like salts of sulfate can be converted into a salt of phosphate. The advantage of making such phosphate salts directly rather than first producing phosphoric acid, as is common to the industry, is that only half as much acid is required to convert the dicalcium phosphate obtained above. These salts, being neutral, can be crystallized or granulated by known processes and technologies for the production of further final products. When nitric acid is used in the mixed leach acid, stainless steel equipment may be used in which one need not guard against hydrochloric acid corrosion and further various nitrates and nitrites can be produced as products.

The following specific Example is intended to further illustrate the present invention in several of its aspects and is not to be considered as limiting thereof.

EXAMPLE

The highly preferred embodiment of the process was applied to a number of highly divergent phosphatic-mineral source materials. Tabulated in the Table are the results of pilot plant runs, following the highly preferred embodiment shown in FIG. 3 and using the illustrative optimized conditions set forth for that figure, on California as-mined ore from Pine Mountain Calif.; Florida as-mined ore from Bartow Fla; Idaho as-mined From the Table it will be noted that different amounts of phosphatic feed materials were used. The amount utilized in each case was to represent 100 pounds of P₂O₅ content in the sample. The amount of leach acid was therefore the same for each case, using 15.19 tons of leach acid per ton of P₂O₅, the leach acid being in proportions of 0.0254 tons hydrochloric acid, 0.1022 tons sulfuric acid and 0.8724 tons water. Therefore also the leach liquor after leaching through drums 4 and 5 being withdrawn in each case has about the same weight and varied from 6.62 to 6.81% P₂O₅ content as shown in the Table. It will be noted that in all cases, except the Sahara rock, the leach liquor contained the same percentages of chemicals. The Sahara rock was different in that the quantity of iron and aluminum minerals were less than sufficient for saturation of the leaching solution. Also it will be noted that the amounts of tailings were quite divergent and directly related to the percentages of inerts and impurities in the ores. Thus the Pine Mountain ore contained high amounts of abrasive silicas and sand fines as well as high amounts of carbonates and clays and the Bartow materials contained high amounts of iron and aluminum. As shown in the Table the relatively dilute leach liquor was then concentrated and purified as shown in FIG. 3 to dicalcium phosphate. The dicalcium phosphate, was then further concentrated by conversion to about 40% phosphoric acid. The percent extraction efficiencies at these stages and over-all are also set forth in the Table. It can be seen that in these divergent samples the over-all percent extraction efficiencies were from 95% to over 99% recovery of the phosphate values in the starting phosphatic mineral containing sources.

While the above Example and Description set forth the present invention in terms of preferred embodiments and operating conditions, it is to be understood that the present invention is not so limited and that variations and modifications thereof may be made without departing from the spirit or scope of this invention. Thus while reference has been made to as-mined phosphate ore it is apparent that any phosphatic-mineral-containing material may be employed in the present process. While reference has been made to highly preferred optimum concentrations and proportions of the leach acid chemicals. FIGS. 1 and 2 show that such may be varied considerably while obtaining the objects and advantages herein. Reference to preferred equipment, temperatures, recycle steps, reconstitution steps, washing and filtration steps are for purpose of maximizing commercial efficiencies and are not necessary to basic operability of the process disclosed.

What is claimed is:

1. A process for the recovery of phosphate values by chemical leaching from a phosphatic-mineral-containing souce material comprising the steps of:
   1. forming an aqueous leach acid mixture of sulfuric acid and a second acid selected from the group essentially consisting of hydrochloric acid and nitric acid, in approximate proportions of about ¾ mole of the second acid, about 1⅛ mole sulfuric acid and about 52⅓ moles water;
   2. mixing the leach acid with crushed phosphatic-mineral-containing source in approximate proportions on the order of about 13.7–16.7 tons leach acid per ton of $P_2O_5$ in the phosphorus-mineral-containing source;
   3. withdrawing a phosphoric acid leach liquor containing about 5–7% $P_2O_5$;
   4. in a step-wise precipitation and concentration; raising the pH of the leach liquor to about 2–3 to precipitate impurities, and separating the impurities precipitated; and then raising the pH of the leach liquor to about 3–5 to precipitate calcium phosphate, and separating the precipitated calcium phosphate.

2. The process of claim 1 in which the leach acid, contains proportions of about 0.750 moles hydrochloric acid, about 1.125 moles sulfuric acid and about 52.29 moles water.

3. The process of claim 1 in which the leach acid contains about 0.0216–0.0292 tons hydrochloric acid, about 0.0869–0.1175 tons sulfuric acid and about 0.7415–1.0033 tons water.

4. The process of claim 3 in which the proportions are .0254 tons hydrochloric acid, 0.1022 tons sulfuric acid and 0.8724 tons water.

5. The process of claim 1 in which, in contacting the leach acid with the phosphatic source, the temperature is approximately 100°–140° F.

6. The process of claim 12 in which the temperature is maintained at approximately 120°–135° F, thereby producing a filter aid gypsum.

7. The process of claim 6 including the additional step of separating and recovering filter aid gypsum.

8. The process of claim 1, in which, in the first precipitation step, the pH is increased to approximately 2.2 to precipitate impurities, and including the step of separating iron and aluminum impurities; then the pH is increased to approximately 2.8 to precipitate fluoride impurities, and including the step of separating fluoride impurities.

9. The process of claim 1 including the additional step of pre-wetting the phosphatic-containing-mineral source with a portion of the leach liquor filtrate containing about 5–7% $P_2O_5$.

10. The process of claim 9 including the additional steps of separating the pre-wetted phosphatic material and supernatant; and adding a portion of the supernatant to the leach liquor in the step-wise precipitation and concentration of the leach liquor.

11. The process of claim 1 including the additional steps of adding, to the filtrate obtained from precipitating and separating calcium phosphate, sufficient sulfuric acid, soluble salt of the second acid constitutent of the leach acid, and water to reconstitute the leach acid mixture; and continuously recycling the treated filtrate to contact additional phosphorus-containing-mineral source.

12. The process of claim 1 in which the phosphatic containing source is as-mined phosphate ore.

13. The process of claim 1 in which the phosphatic containing source is phosphate rock.

* * * * *